United States Patent [19]

Hickox

[11] Patent Number: 4,672,853
[45] Date of Patent: Jun. 16, 1987

[54] APPARATUS AND METHOD FOR A PRESSURE-SENSITIVE DEVICE

[75] Inventor: Robert E. Hickox, Tucson, Ariz.

[73] Assignee: Burr-Brown Corporation, Tucson, Ariz.

[21] Appl. No.: 666,372

[22] Filed: Oct. 30, 1984

[51] Int. Cl.$^4$ ............... G01L 7/08; G01L 9/06; G01L 19/04
[52] U.S. Cl. ............................................ 73/708
[58] Field of Search ............. 73/DIG. 4, 727, 721, 73/708; 338/3, 4, 42

[56] References Cited

U.S. PATENT DOCUMENTS

| | | | |
|---|---|---|---|
| 4,300,395 | 11/1981 | Shirouzu et al. | 73/708 |
| 4,320,664 | 3/1982 | Rehn et al. | 73/708 |
| 4,333,349 | 6/1982 | Mallon et al. | 73/708 |
| 4,462,018 | 7/1984 | Yang et al. | 73/DIG. 4 |

OTHER PUBLICATIONS

Beklemisheu et al, Meas. Tech. (U.S.A.), vol. 23, No. 5, pp. 405–408, May, 1980.
Roger Allan, "Sensors In Silicon", High Tech., Sep., 1984, pp. 43–50.

*Primary Examiner*—Donald O. Woodiel
*Attorney, Agent, or Firm*—Harry M. Weiss & Associates

[57] ABSTRACT

A pressure sensing device including a single crystal of silicon configured to have a diaphram portion, a frame portion and associated circuitry formed on the crystal is described. Piezo-resistive elements on the boundary of the frame and the diaphram portions of the crystal responds to changes in pressure. The piezo-resistive elements, associated elements, and connecting conducting paths are formed by thin film and/or doping techniques to provide a monolithically integrated circuit. The elements are passive and require only application of input voltages and detection of output signals to provide an operative component. Trimmable resistors are provided for compensation and resistive adjustment, and at least one resistive element provides temperature compensation.

3 Claims, 4 Drawing Figures

APPARATUS AND METHOD FOR A PRESSURE-SENSITIVE DEVICE

BACKGROUND OF THE INVENTION

1. Field of the Invention

This invention relates generally to pressure sensing devices and, more particularly to devices for sensing pressure that are comprised of passive integrated circuit elements fabricated on a single crystal.

2. Discussion of the Related Art

It is known in the related art that deformation of an integrated circuit type of resistive element can cause a change in the value of the resistance, generally referred to as a piezo-resistive effect. Typically resistive elements are formed on deformable sections of a material and the variations in the resistance can be used to determine the force applied to the material.

Theses devices, as implemented in the past, have several disadvantages that have limited their usefulness. In particular, although the piezo-resistive elements are formed on the deformable material, the associated elements are typically comprised of discrete components and are located in a separate circuit area. To increase sensitivity and accuracy, the piezo-resistive elements are typically components of a bridge circuit, requiring several associated circuit elements. The use of a discrete elements is not an effective use of space. In addition, the resistive elements are temperature dependent and, for accurate pressure measurements, temperature compensation is required.

A need was therefore felt for a component that includes, not only the piezo-resistive elements, but the associated circuit elements as well. A further requirement for the component is the use of passive circuit elements and the inclusion of temperature compensation in the component.

SUMMARY OF THE INVENTION

It is therefore an object of the present invention to provide an improved pressure sensing device.

It is another object of the present invention to provide a precision monolithic pressure sensing device.

It is still another object of the present invention to provide a monolithic pressure sensing device comprised of passive elements.

It is yet another object of the present invention to provide a thin diaphram pressure transducer fabricated from a single crystal of material.

It is yet another object of the present invention to provide ion implanted piezo-resistive elements along with temperature compensation on a thin diaphram pressure transducer.

It is yet another object of the present invention to provide a thin diaphram pressure transducer with piezo-resistive elements as pressure sensing elements.

It is a still further object of the present invention to provide a thin diaphram pressure transducer containing the temperature compensating elements fabricated on the pressure transducer device.

The aforementioned and other objects are accomplished, according to the present invention, by a thin diaphram pressure transducer in which components have been formed in a single crystal of silicon to produce piezo-resistive elements, resistive elements and temperature compensating elements. The element network on the single crystal of silicon is a bridge circuit and the elements of circuit are all passive elements, permitting application of either AC or DC signals. The device can be used to measure pressure in a fluid and particularly, the device can be located in an intravenous tube to monitor the blood pressure of the patient.

These and other features of the present invention will be understood upon reading of the following description along with the figures.

BRIEF DESCRIPTION OF THE DRAWINGS

FIG. 1b is a cross-section view of the thin film diagram device of FIG. 1a.

OPERATION OF THE PREFERRED EMBODIMENT

Detailed Description of the Figures

Figure 1A:
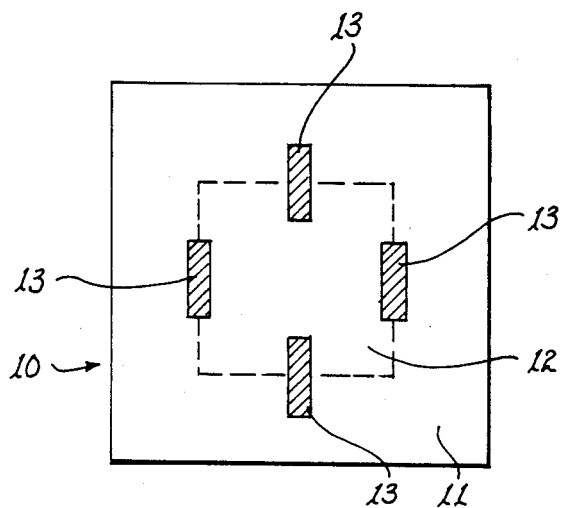
FIG. 1a is a top view of the thin film diaphram device showing the general location of the piezo-resistive elements.

Referring now to FIG. 1a, the pressure transducer 10 of the present invention is shown. The pressure transducer consists of a single crystal of silicon, having a frame region 11 and a thin diaphram region 12. Generally, at the intersection of the frame and the diaphram, the piezo-resistive elements consisting of a diffusion by an appropriate material of the single crystal silicon are shown.

Figure 1B:
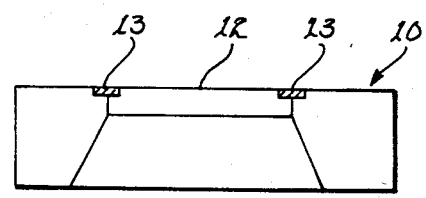

Referring now to FIG. 1b, a cross-section approximately in the middle of the pressure sensitive transducer 10 is shown. The diaphram region 12 is shown as well as the doped regions 13 which exhibit the piezo-resistive effect.

Figure 2:
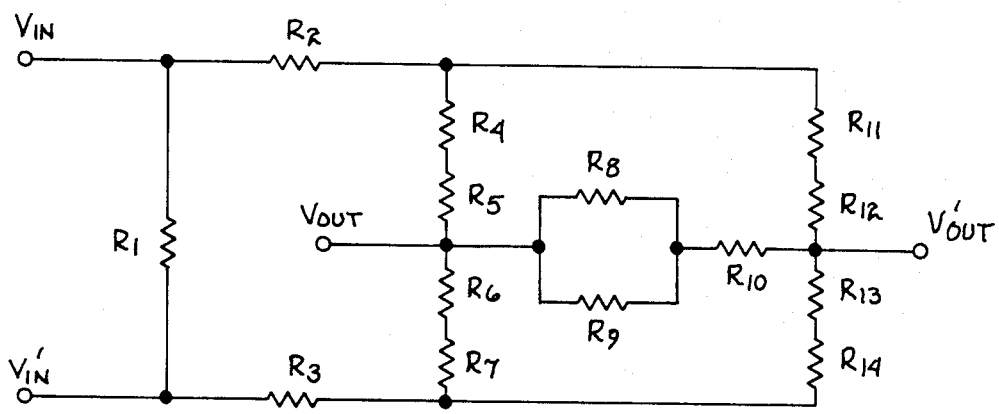
FIG. 2 is a circuit diagram of the elements of the instant invention formed on the thin film diaphram device.

Referring now to FIG. 2, the electrical circuit structure of the pressure sensitive transducer is shown. Two input terminals $V_{in}$ and $V'_{in}$ are present. $V_{in}$ is coupled to a first terminal of resistor $R_2$ and to a first terminal of resistor $R_1$. $V'_{in}$ is coupled to a second terminal of resistor $R_1$ and to a first terminal of resistor $R_3$. A second terminal of resistor $R_2$ is coupled to a first terminal of resistor $R_4$ and to a first terminal of resistor $R_{11}$; while a second terminal of resistor $R_3$ is coupled to a first terminal of resistor $R_7$ and to a first terminal of resistor $R_{14}$. A second terminal of resistor $R_4$ is coupled to a first terminal of resistor $R_5$, a second terminal of resistor $R_{11}$ is coupled to a first terminal of resistor $R_{12}$, a second terminal of resistor $R_7$ is coupled to a first terminal of resistor $R_6$, and a second terminal of resistor $R_{14}$ is coupled to a first terminal of resistor $R_{13}$. A $V_{out}$ terminal is coupled to a second terminal of resistor $R_5$, a second terminal of resistor $R_6$ terminal, a first terminal of resistor $R_8$, and to a first terminal of resistor $R_9$. A $V'_{out}$ terminal is coupled to a second terminal of resistor $R_{12}$, to a second terminal of resistor $R_{13}$, and through resistor $R_{10}$ to a second terminal of resistor $R_8$ and to a second terminal of resistor $R_9$. A resistor $R_{15}$, coupled between a second terminal of resistor $R_2$ and a second terminal of resistor $R_3$, is shown by dotted lines.

Figure 3:
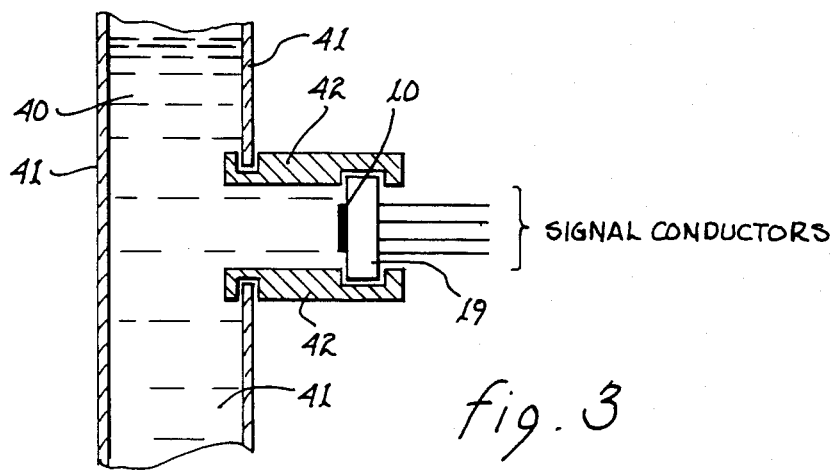
FIG. 3 is a cross-sectional view of the use of the device in sensing pressure in a fluid-filled container.

Referring now to FIG. 3, a tube 41 containing a fluid 40 is shown. An interface mechanism 42 is coupled to the walls of the tube 41 containing the fluid and to the pressure sensitive device 10. The fluid 40 is in contact with the pressure sensor transducer 10. The four leads that couple terminals $V_{in}$, $V'_{in}$, $V_{out}$ and $V'_{out}$ and labelled signal conductors in the figure are indicated as coupling directly to the pressure sensitive elements. It will be clear that this is a schematic representation and an interface element can be necessary for electrical coupling of the pressure sensitive transducer 40 and the signal conductors.

Operation Of The Preferred Embodiment

Referring once again to FIG. 1a and FIG. 1b, a thin diaphram 12 and a frame 11 are constructed of a single crystal of silicon. In the region of the inter-section of the diaphram portion 12 and the frame portion 11, a diffusion by a selected material is performed in the silicon that results in a resistor at each intersection of the diaphram and the frame. These resistors 13 form the elements of a Wheatstone bridge and when pressure is applied to the diaphram, a distortion of the doped-area resistors produces a measurable piezo-resistive effect.

Referring now to FIG. 2, resistors $R_5$, $R_6$, $R_{12}$ and $R_{13}$ are the schematic representations of the Wheatstone bridge resistors implemented by the four diffused regions 13 for pressure sensitive device 10. The other reslstors, $R_1$, $R_2$, $R_3$, $R_8$, and $R_{10}$, and the conducting paths are all formed on the silicon crystal by the deposition on the silicon single crystal appropriate materials. Resistor $R_9$ is formed by doping a region of the silicon single crystaal. Resistors $R_4$, $R_{11}$, $R_{14}$ and $R_7$ are placed in the circuit to permit an adjustment of the resistance in each of the branches. Thus, these resistors are trimmable type of resistors that permit a variation in the resistive value through, for example, the use of a laser to burn away part of the resistive element. These resistors are adjusted for a zero voltage between the $V_{out}$ and the $V'_{out}$ terminal. The resistors $R_8$ and $R_{10}$ are also trimmable resistors and are used to establish the output resistance of the network. Resistor $R_2$ and $R_3$ are trimmable resistors whose values can be chosen to set the circuit sensitivity. Resistor $R_1$ is a trimmable resistor whose value can be chosen to set the circuit input resistance.

A particularly critical resistance for this device is resistor $R_9$. As temperature is increased, the piezo-resistive effect of resistors $R_5$, $R_6$, $R_{12}$ and $R_{13}$ decreases. Resistor $R_9$ is chosen to have a positive temperature coefficient to compensate for the decrease in the piezo-resistive effect with temperature. The temperature coefficient of the resistor $R_9$ can be controlled by the dopant level. The temperature coefficient of resistance for silicon for a multiplicity of doping atoms is well-known in the literature. Similarly, resistor 15 can be a doped region resistor with a positive temperature coefficient either to replace resistor 9 or to assist resistor 9 in the compensation process.

The zero pressure offset of the bridge configuration is dependent on the match of temperature coefficient of resistance of the bridge resistors. The match of the temperature coefficient of resistance of the resistors is dependent on how well the dopant concentration among the bridge resistors is equalized. Using an ion implantation technique combined with low temperature coefficient of resistance thin film resistors for trimming resistances produces a weak dependence of the zero pressure offset with temperature.

The use of passive elements in the bridge circuit and in the compensation circuit allows either AC or DC voltage to be applied to the input terminals.

Referring again to FIG. 3, an application of the instant invention is shown. The pressure sensing transducer 10 is mounted so as to be in contact with the fluid 40. The signal conductors apply $V_{in\ and}\ V'_{in}$ to the transducer and receive $V_{out}$ and $V'_{out}$ from the transducer. When the fluid column is associated with an intervenous device, the blood pressure can be monitored.

The above description is included to illustrate the operation of the preferred embodiment and is not meant to limit the scope of the invention. The scope of the invention is to be limited only by the following claims. From the above discussion, many variations will be apparent to one skilled in the art that would yet be encompassed by the spirit and scope of the invention.

What is claimed is:

1. A pressure sensing device having monolithic elements associated therewith, comprising, in combination:
    a single crystal of silicon having a diaphragm region and a frame region;
    piezo-resistive elements located near a boundary of said diaphragm and said frame;
    conducting elements coupling said piezo-resistive elements into a bridge circuit having input and output terminals;
    temperature compensating means including a resistive means having a positive temperature coefficient coupled between said output terminals of said bridge circuit to provide temperature compensation of said bridge circuit; and
    a plurality of trimmable resistance element means for balancing said bridge circuit, each of said trimmable resistive means located in series with each of said piezo-resistive elements.

2. The pressure sensing device of claim 1, further including trimmable input resistive element means coupled in series with each input terminal for adjusting the sensitivity of said bridge circuit.

3. A pressure sensing device having monolithic elements associated therewith comprising:
    a single crystal of silicon having a diaphragm region and a frame region;
    piezo-resistive elements located near a boundary of said diaphragm and said frame;
    conductive elements coupling said piezo-resistive elements into a bridge circuit having input and output terminals;
    temperature compensating means including a resistive means having a positive temperature coefficient coupled between said output terminals of said bridge circuit to provide temperature compensation of said bridge circuit;
    input temperature compensating means including a resistive means having a positive temperature coefficient coupled between said input terminals of said bridge circuit to provide temperature compensation for said bridge circuit;
    trimmable resistive means located between said input terminals of said bridge circuit for adjusting an input resistance; and
    trimmable resistive means located between said output terminals to adjust an output resistance.

* * * * *

UNITED STATES PATENT AND TRADEMARK OFFICE
CERTIFICATE OF CORRECTION

PATENT NO. : 4,672,853
DATED      : June 16, 1987
INVENTOR(S): Robert E. Hickox

It is certified that error appears in the above-identified patent and that said Letters Patent is hereby corrected as shown below:

Figure 2 should be deleted to appear as shown below.

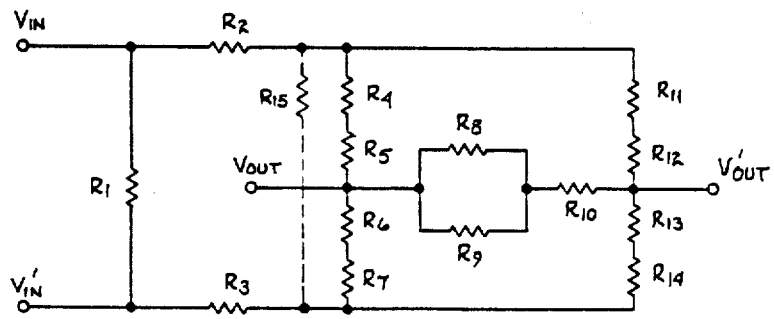

fig. 2

Signed and Sealed this

Fifteenth Day of November, 1988

*Attest:*

DONALD J. QUIGG

*Attesting Officer*  *Commissioner of Patents and Trademarks*